(No Model.)
E. H. ALLEN.
ELECTRIC RAILWAY TROLLEY.
No. 498,046. Patented May 23, 1893.
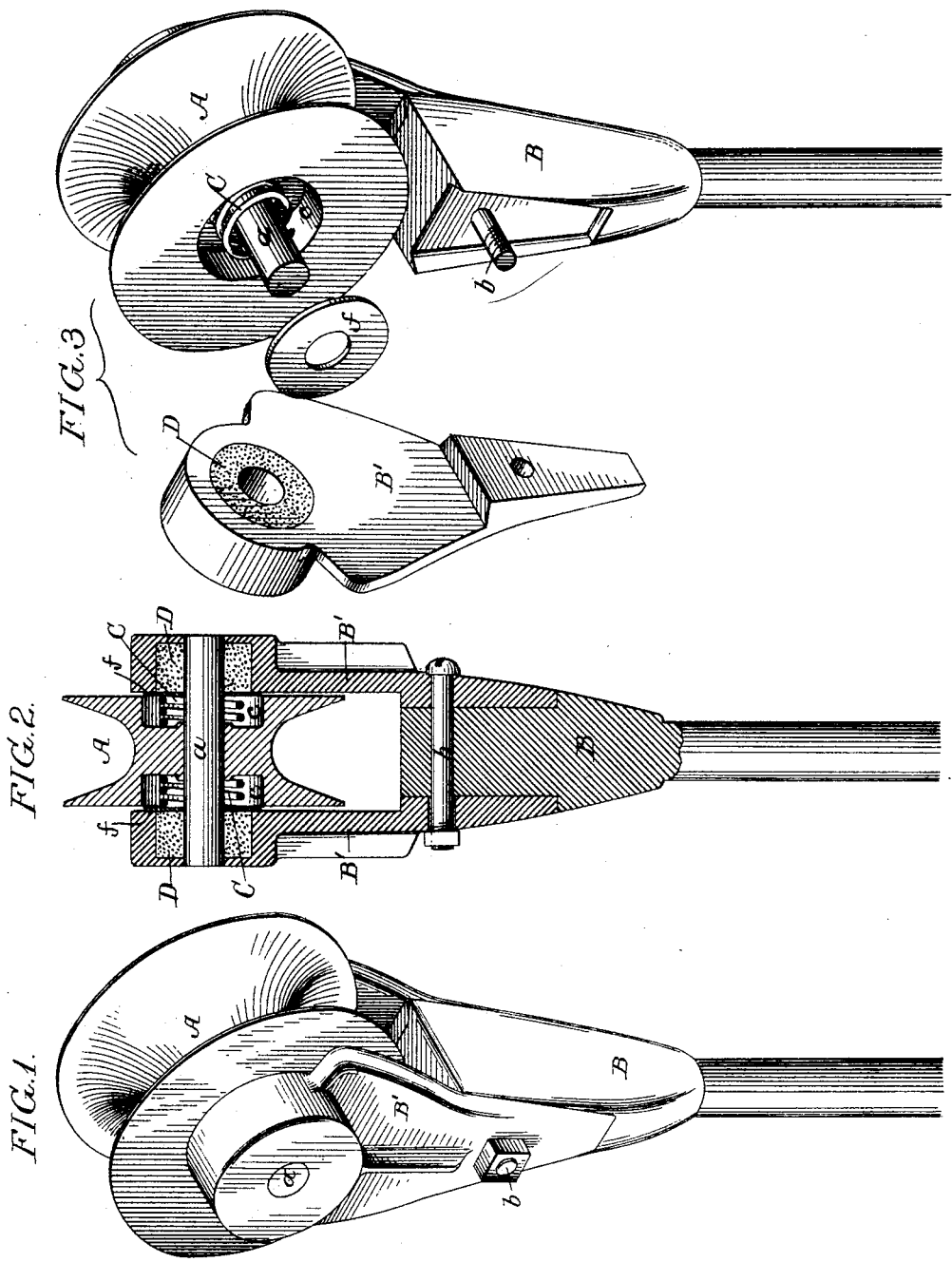
Witnesses:
Alex. Barkoff
R. Schleicher
Inventor
Edward H. Allen
by his Attorneys
Howson & Howson

UNITED STATES PATENT OFFICE.

EDWARD H. ALLEN, OF CRAMER HILL, NEW JERSEY, ASSIGNOR OF TWO-THIRDS TO WILLIAM A. BARRETT, JR., OF PHILADELPHIA, PENNSYLVANIA.

ELECTRIC-RAILWAY TROLLEY.

SPECIFICATION forming part of Letters Patent No. 498,046, dated May 23, 1893.

Application filed November 16, 1892. Serial No. 452,185. (No model.)

*To all whom it may concern:*

Be it known that I, EDWARD H. ALLEN, a citizen of the United States, and a resident of Cramer Hill, Camden county, New Jersey, have invented certain Improvements in Trolleys for Electric Railways, of which the following is a specification.

The object of my invention is to so construct a trolley and its arm that it will move freely, and at the same time maintain a good contact.

In the accompanying drawings:—Figure 1, is a perspective view of my improved trolley for electric railways. Fig. 2, is a sectional view; and Fig. 3, is a detached perspective view showing one of the trolley arms detached.

B is the arm which is secured to the car at one end, and carries the trolley A at the opposite end. Projecting from this arm are two bearing supports B'. These bearing supports are mounted in pockets in each side of the upper end of the arm B, and are secured to the arm by a bolt b. In some instances two bolts may be used, in which case the pockets are not necessary.

D, D are bearings adapted to pockets in the supports B', and are preferably made of plumbago, or other self-lubricating material.

The trolley wheel A is so shaped as to receive the wire or other conductor, and has secured to it a shaft or trunnion a, which passes through the wheel and rests in the two bearings, as clearly shown in Fig. 2. In each side of the trolley wheel A are pockets c, in which rest springs C, and between these springs and the face of each bearing D, are plates f. These plates and springs insure proper contact between the trolley wheel and support, and the bearing D being made of plumbago, which is a good conductor of electricity, provides a much better contact than the old arrangement where lubricating oil had to be used.

The device can be readily taken apart for repairs by simply removing one side of a support, as shown in Fig. 3, and it will be understood that the trolley, while shown as an overhead trolley, can be used with the underground system, or in connection with any form of carriage, without departing from my invention.

I claim as my invention—

1. The combination of a trolley wheel, spindles thereon, pockets in each side of said wheel, springs in said pockets, bearings for the said spindles, bearing supports having pockets adapted to receive the bearings, substantially as described.

2. The combination in a trolley of the trolley-wheel, spindle secured thereto, bearings for said spindle, supports for the bearings, the lower ends of said supports being perforated, a supporting arm, pockets therein to receive the lower ends of said supports, with a bolt passing through the perforations in the said supports and through the arm, substantially as described.

3. The combination of the trolley-wheel, the spindles therefor, an annular recess in each side of the wheel surrounding the spindles, bearings for the spindles, supports therefor, a spring mounted in each recess in the wheel, and plates between the springs and the bearings, substantially as described.

In testimony whereof I have signed my name to this specification in the presence of two subscribing witnesses.

EDWARD H. ALLEN.

Witnesses:
 JOSEPH H. KLEIN,
 HENRY HOWSON.